May 15, 1951

J. D. McCULLOUGH 2,553,059

SYNCHRONIZER

Filed Aug. 8, 1945.

INVENTOR.

Jack D. McCullough

BY

Harness and Harris

ATTORNEYS.

Patented May 15, 1951 2,553,059

UNITED STATES PATENT OFFICE 2,553,059

SYNCHRONIZER

Jack D. McCullough, Detroit, Mich., assignor to Chrysler Corporation, Highland Park, Mich., a corporation of Delaware Application August 8, 1945, Serial No. 609,587

4 Claims. (Cl. 315—29)

This invention relates to the production for control purposes of a voltage of constant amplitude in response to a repeated signal and at the same frequency as that of the signal.

More specifically, the invention relates to increasing the usefulness of the ordinary cathode ray oscilloscope, by making it possible to interpret more satisfactorily the patterns formed on a fluorescent screen by the oscilloscope.

When observing and recording oscillographic indications on a cathode ray tube, the operator must continually adjust the frequency of the internal sweep voltage generator, to keep the pattern formed on the screen from drifting to the right or to the left. To be examined in minute detail or to be photographed, the patterns formed on a cathode ray tube must remain stationary in space. Consequently, the frequency of the sweep voltage generator must be in exact synchronism with the observed phenomena.

By methods well known in the art, it is possible to maintain the proper degree of synchronism only over very small frequency changes, and at the sacrifice of a loss of a portion of the full horizontal voltages.

The invention described herein automatically performs the function of keeping the horizontal sweep voltage generator in exact synchronism with a given phenomenon over a very wide range of frequencies, and with no loss of intelligible information. This means that no matter how the frequency of the phenomenon applied to the first set of deflecting plates of the cathode ray oscilloscope may vary, the sweep voltage applied to the second set of deflecting plates of the cathode ray oscilloscope will be in exact synchronism.

An object of the present invention is to provide for the generation of a voltage of constant amplitude from a signal at the frequency of the signal. The invention may be applied to a saw tooth wave generator operating in response to an impressed signal and will then involve a control exerted by the signal in such a way as to cause the sawtooth wave generator voltage tending otherwise to vary inversely with frequency of the signal impressed to be of constant amplitude.

An object of the present invention is to provide improvements in the manner of operation of a cathode ray oscilloscope. This will involve a means for more satisfactorily interpreting patterns formed on a screen by the oscilloscope.

A further object is to provide a control in conjunction with a cathode ray oscilloscope for keeping patterns formed on a screen by the oscilloscope from drifting from one side to the other. This involves automatically keeping the frequency of a sweep voltage generator in exact synchronism with phenomena being observed.

Other objects will appear from the disclosure.

The invention comprises a system of controls applied to an ordinary gas-triode sawtooth-generator of a type well known in the art. However, it is to be understood that the method of controls described herein is equally applicable to hard vacuum tube sawtooth generators.

Figure 1:
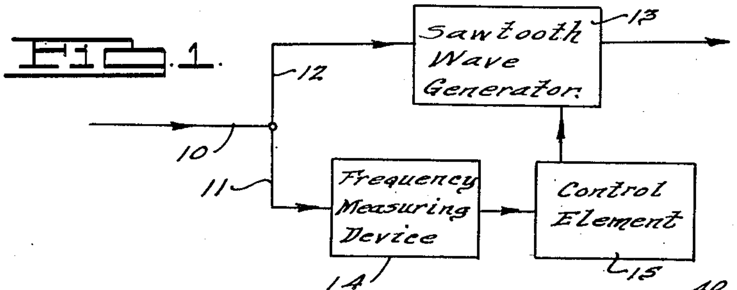
Fig. 1 is a block diagram illustrating the broad principles of the present invention.

As seen in Fig. 1, there is applied through a path 10, an input voltage that is concurrent with a signal to be observed on one set of deflection plates of a cathode ray oscilloscope, for example, the plates for vertical deflection. The path 10 branches into paths 11 and 12, leading, respectively, to a frequency measuring device 14 and a control element 15, and to a sawtooth wave generator 13. The purpose of the input voltage is to initiate a particular sawtooth wave on the generator 13 each time the voltage occurs and to operate the frequency measuring device 14. This device produces a voltage directly proportional to the frequency of the input voltage. The voltage so produced is applied to the control element 15 so as to change its resistance in a manner necessary to cause the sawtooth generator to produce one sawtooth wave of constant amplitude for each input signal.

Figure 2:
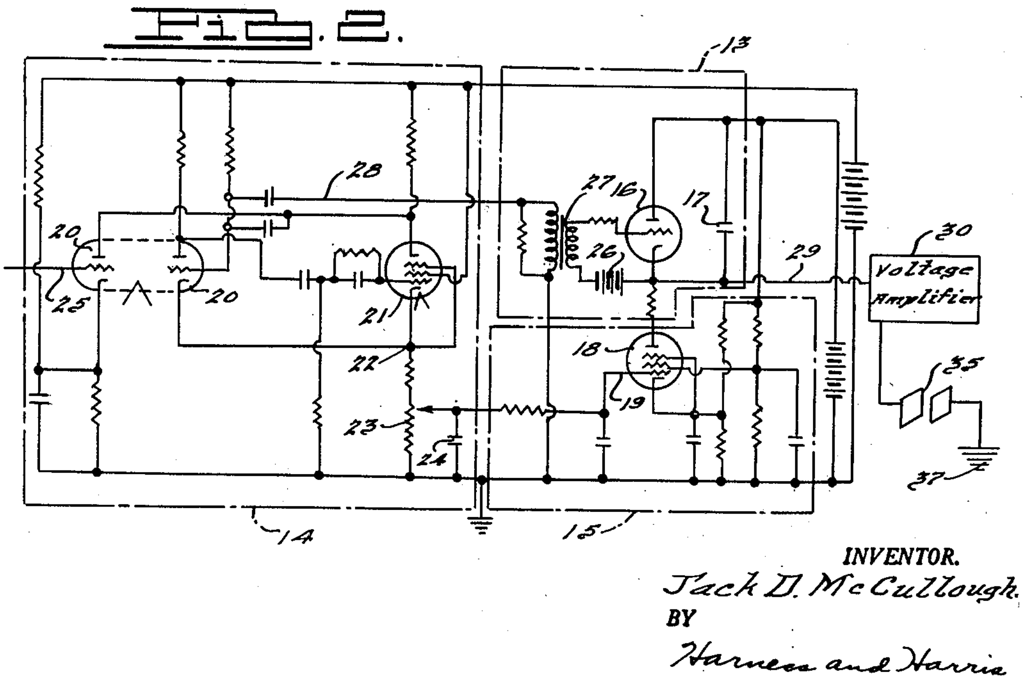
Fig. 2 is a circuit diagram of the essential portions of the invention.

In Fig. 2 is shown the sawtooth wave generator 13 including the gas triode tube 16 and its associated condenser 17. In series with the condenser 17 is a control tube 18, a pentode whose apparent plate series resistance may be varied at will by a change of the grid bias voltage applied at line 19. The bias voltage is made to vary with the frequency of the signal observed on the same one set of deflection plates mentioned in the preceding paragraph, which may in the conventional oscilloscope be the plates for vertical deflection, in such a way as to cause the frequency of oscillation of the gas-triode sawtooth wave generator to be substantially synchronous with the frequency of the voltage applied to the said one set of deflection plates. Tubes 20 and 21, which when combined as shown in Fig. 2, form the frequency measuring device 14, will produce the bias voltage at the line 19 on the control tube 18 in direct proportion to the frequency of voltage applied across the vertical deflection plates. Briefly, the tubes 20 and 21 produce at junction point 22 one square wave pulse for each input signal. Resistor 23 and condenser 24 form an integrating network, the output voltage of which is proportioned to an average of the voltage applied at the junction point 22.

Consider now the line 25 connected to one grid of tube 20. Across this line is to be impressed a signal comprising a recurrent voltage, the frequency of which is equal to that of a signal to be observed. A signal of this frequency is impressed across the said one set of deflection plates of a cathode ray oscilloscope, for example, the vertical deflection plates. The purpose of impressing the signal of this frequency on the line 25 connected to the various parts described in the preceding paragraph is to obtain another signal of the same frequency to be impressed across the other set of deflection plates of the cathode ray oscilloscope, for example, the horizontal deflection plates. Each signal applied to line 25 is transformed by tubes 20 and 21 into a square wave pulse at junction point 22. Resistor 23 and condensor 24 produce at lead 19 connected to tube 18 a bias voltage proportional to the frequency of the voltage at junction point 22, which is the same as the frequency of the signal impressed at line 25. Since the apparent plate series resistance of the control tube 18 varies inversely with applied voltage, this resistance varies inversely with the frequency of the signal impressed at line 25.

The control tube 18 is so connected with the sawtooth wave generator 13 that the triode tube 16 thereof is connected in series with the resistance of the control tube 18, which varies inversely with the signal frequency at line 25. Control tube 18 is so adjusted that it causes the tube 16 to be in substantial synchronism with the input signal applied at line 25, because the resistance of tube 18 determines the rate of charge of the condenser 17 associated with tube 16, and the resistance of tube 18 varies inversely with signal frequency at line 25. Exact synchronism is assured by biasing grid of tube 16 to cut-off by battery 26 so that this tube can generate a signal only when a signal is applied to the grid of tube 16 through transformer 27 from line 28, in which a signal appears each time a signal appears on line 25. The apparatus just described for exact synchronism would by itself cause the amplitude of the signal generated by the sawtooth wave generator 13 to decrease with increase in frequency. Compensation for this is provided in the resistance of control tube 18. This resistance decreases with increase in frequency and therefore brings about a faster charging rate for the condenser 17 with a higher frequency. Thus the amplitude is constant or nearly constant.

The signal of the sawtooth wave generator 13 is received at line 29 and transmitted through a voltage amplifier 30. The increased signal goes from the voltage amplifier to horizontal deflection plates 35 and then to a ground 37.

Figure 3:
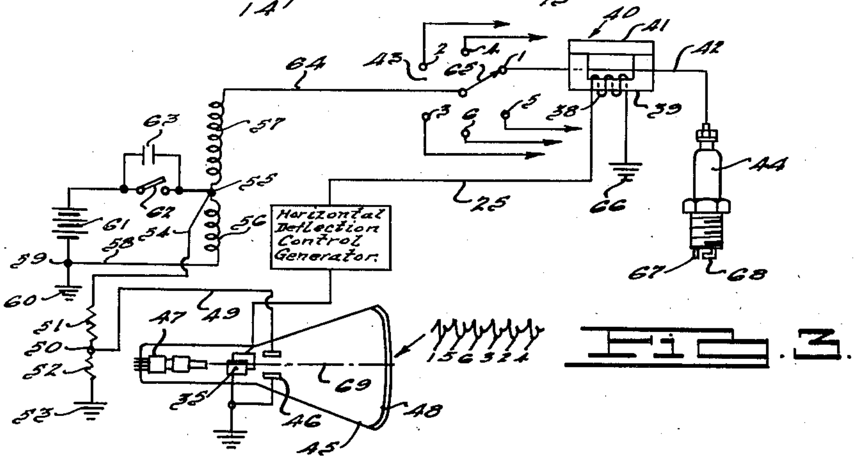
Fig. 3 shows the application of the invention to an ignition system of an engine.

Fig. 3 shows the application of the apparatus of Fig. 2 to an ignition system for an engine, the apparatus of Fig. 2 being designated in Fig. 3 as a horizontal deflection control generator.

The line 25 leads to a coil 38 about an arm 39 of an electromagnetic pick-up or current transformer 40, having also a removable arm 41. Through the pick-up extends a conductor 42 leading from a contact of a distributor 43 for a No. 1 engine cylinder to a spark plug 44. The horizontal deflection plates 35 associated with the output side of the horizontal deflection control generator form part of a cathode ray oscilloscope 45, which also includes vertical deflection plates 46 connected at one side to ground as are the horizontal deflection plates 35. The oscilloscope 45 has the usual electrode gun 47 and the target or screen 48. One of the vertical deflection plates is connected to a conductor 49 leading to a junction point 50 between resistance elements 51 and 52, constituting a voltage divider. The voltage divider is grounded at 53. A line 54 leads from the voltage divider to a junction point 55 between a primary winding 56 and a secondary winding 57 of a transformer. A line 58 leads from the primary winding 56 to a junction point 59, which is grounded as indicated at 60. An energy source such as a battery 61 is connected at one side to the junction point 59 and at the other side to the junction point 55 through conventionally represented breaker points, shown for illustrative purposes as the switch 62, across which is connected a capacitor 63. A line 64 leads from the secondary winding 57 to a rotating arm 65 of the distributor 43. The coil 38 is grounded at 66. Various contacts, shown by the numerals 1 through 6, inclusive, of the distributor 43 are intended to connect to different cylinders of the complete motor, with the numerals adjacent each terminal point being indicated in a conventional manner relative to the rotation of the distributor arm 65. The illustration is intended to show one suitable form of firing order, which it may be assumed follows the designations 1, 5, 6, 3, 2, and 4, although it is to be understood that this is merely given for the purpose of illustration, as is likewise the illustration of the assumed six cylinders, for it is obvious that in automotive engines, the number may vary within wide limits, and particularly for aircraft engines the numbers of cylinders and resultant distributor points are very substantialy increased.

There has been shown only a single spark plug element 44 to which energy is supplied by way of the conductor 27 connecting to the upper terminal thereof in known manner. It will be appreciated, however, that other spark plugs (not shown) connect to each of the other points 5, 6, 3, 2, and 4 in substantially like manner. The energy supplied by way of the breaker points, the transformer and the distributor to the spark plugs is discharged across the gap provided between points 67 and 68, which are also shown in purely conventional manner.

In order that the spark discharge may be measured and observed, control is exerted over the deflection of a cathode ray beam 69 within the cathode ray oscilloscope 45 in a manner later to be explained. The electron gun 47 of the oscilloscope tube 45 is represented in purely schematic form, and is adapted when suitably energized by appropriate operating voltages from sources not shown, to produce the electron beam 69 which is directed longitudinally of the tube to strike against the luminescent end wall target or screen 48, where it produces a luminous trace due to impact.

In the path of the beam 39 as it moves from the electron gun 33 to the target or screen 41, suitable deflecting means are provided. These deflecting means may be either electrostatic or electromagnetic, or a combination of these two forms, but for illustrative purposes, the drawing shows the horizontal deflection as provided by electrostatic means consisting of two deflecting plate electrode members 35, and the vertical deflection likewise is assumed to be controlled by the electrostatic deflecting plate pair 46. For the purpose of providing horizontal deflection of the electron beam 60 within the tube 45, the horizontal deflection control generator of Fig. 2 has been provided.

The voltage across the primary winding 56 appears each time a spark occurs in any of the spark plugs 44, and since the vertical deflection plates 46 are connected by the line 49 between the voltage divider 51, 52 connected between the primary and secondary windings 56 and 57 of the transformer, a vertical deflection of the cathode ray beam will be produced by the plates 46 each time a spark occurs at a spark plug.

The horizontal deflection control generator is synchronized through induction produced by current flowing in the line 42 leading to any of the spark plugs 44 and acting through the magnetic pick-up 40 to induce a current in the line 25 leading to the horizontal deflection control generator. The use of the magnetic pick-up 40 not only effects synchronization of the system but also enables an observer to determine which pattern in the screen 48 is associated with a particular plug. The pattern of the plug having the conductor 42 with which the magnetic pick-up is associated is at one end of the screen, conventionally, the left end, and the other patterns will follow in order to designate the plugs following in the firing order after the particular plug. For instance, the magnetic pick-up is associated with the conductor for plug No. 1, and the order of plugs following thereafter is 5—6—3—2—4. Thus, as indicated, the pattern at the left end of the screen is for plug No. 1, and the other patterns are in order from left to right for plugs Nos. 5—6—3—2—4.

Although the invention has been illustrated as a horizontal deflection control generator for a cathode ray oscilloscope and the oscilloscope is shown to be used for studying the ignition system of an engine, it is to be understood that the invention is not limited in its use to an oscilloscope or to the study of an engine ignition system, but may have many and widely varied uses.

The intention is to limit the invention only within the scope of the appended claims.

I claim:

1. In combination, a first grid-controlled tube having an anode-cathode path, a second grid-controlled tube having an anode-cathode path, a relatively fixed resistance in common to said tubes in series in the anode-cathode paths for making available a control voltage, a wave generator comprising a condenser having a variable resistance adapted to be controlled by said control voltage, and a third grid-controlled tube connected in parallel with said condenser, means for impressing a recurring signal on the grids of said third and first grid-controlled tubes respectively for discharging said condenser and for causing a voltage pulse to be made available at said resistance in the anode-cathode paths as limited by the value of said resistance and independent of the amplitude of the recurring signal, and means for averaging and applying said pulses to the variable resistance in a manner to vary the value of the latter inversely with the frequency of said pulses and recurring signals and independently of the amplitude of the recurring signals.

2. In apparatus for observing the spark behavior in a cylindered ignition engine having at least one spark plug, first and second grid-controlled tubes having anode-cathode paths provided with a common portion, and means forming a resistance in said common portion for making available a control voltage, a wave generator having a condenser for output adapted to be charged and then discharged to produce a varying output voltage, means for impressing a recurring signal produced as an incident of spark discharge in said spark plug during engine operation, upon said wave generator and on the grid of said first grid-controlled tube respectively for discharging the condenser at frequency corresponding to the rate of recurrence of spark discharge in said spark plug and for causing a voltage pulse to be made available at said resistance in the anode-cathode paths as limited by the value of said resistance and independent of the amplitude of the recurring spark discharge signal, and means for employing the voltage pulse as control voltage for the wave generator to vary the charging rate of the condenser in proportion to the frequency of the voltage pulse and spark discharge signal and independent of the amplitude of the spark discharge signal.

3. The combination with a cathode-ray oscilloscope having means for producing an electron beam, a first means for deflecting the electron beam in one of two mutually perpendicular directions, a second means for deflecting the electron beam in the other of the two mutually perpendicular directions, the first deflecting means being energized by a recurring signal and being observed; of a first grid-controlled tube having an anode-cathode path, a second grid-controlled tube having an anode cathode path, a relatively fixed resistance in common to said tubes in series in the anode-cathode paths for making available a control voltage, a wave generator comprising a condenser having the output voltage thereof applied to the second deflecting means, and a third grid-controlled tube connected in parallel with said condenser, said condenser having a variable resistance adapted to be controlled by said control voltage for varying the charging rate of the condenser, means for impressing a recurring signal on the grids of said third and first grid-controlled tubes respectively for discharging said condenser and for causing a voltage pulse to be made available at said resistance in the anode-cathode paths as limited by the value of said resistance and independently of the amplitude of the recurring signal, and means for averaging and applying said pulses to the variable resistance in a manner to vary the value of the latter inversely with the frequency of said pulses and recurring signals and independently of the amplitude of the recurring signals.

4. The combination with a cathode-ray oscilloscope having means for producing an electron beam, a first means for deflecting the electron beam in one of two mutually perpendicular directions, a second means for deflecting the electron beam in the other of two mutually perpendicular directions, the first deflecting means being energized by a receiving signal and being observed; of first and second grid-controlled tubes having anode-cathode paths provided with a common portion, and means forming a resistance in said common portion for making available a control voltage, a wave generator having an output condenser adapted to be changed and then discharged to produce a varying output voltage applied to the second deflecting means, means for impressing said recurring signal on the wave generator and upon the grid of said first grid-controlled tube respectively for discharging the condenser to give its output voltage a frequency equal to that of the signal impressed and for causing a voltage pulse to be made available at said resistance as limited by the value of said resistance and independently of the amplitude of said recurring signal, and means for employing the voltage pulse as control voltage for the wave generator to vary the charging rate of the condenser in proportion to the frequency of the voltage pulse and recurring signal and independently of the amplitude of the recurring signal.

JACK D. McCULLOUGH.

REFERENCES CITED

The following references are of record in the file of this patent:

UNITED STATES PATENTS

| Number | Name | Date |
|---|---|---|
| 1,934,322 | Osbon | Nov. 7, 1933 |
| 2,266,516 | Russell | Dec. 16, 1941 |
| 2,420,303 | De France | May 13, 1947 |
| 2,448,069 | Ames, Jr., et al. | Aug. 31, 1948 |